(12) United States Patent
Nakamura

(10) Patent No.: US 10,773,659 B2
(45) Date of Patent: Sep. 15, 2020

(54) ELECTRONIC COMPONENT MOUNTED MEMBER, IMAGING DEVICE, AND IMAGING DEVICE FOR VEHICLE MOUNTING

(71) Applicant: Nidec Copal Corporation, Tokyo (JP)

(72) Inventor: Yuta Nakamura, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 7 days.

(21) Appl. No.: 16/085,389

(22) PCT Filed: Mar. 24, 2017

(86) PCT No.: PCT/JP2017/012189
§ 371 (c)(1),
(2) Date: Sep. 14, 2018

(87) PCT Pub. No.: WO2017/170287
PCT Pub. Date: Oct. 5, 2017

(65) Prior Publication Data
US 2019/0071028 A1 Mar. 7, 2019

(30) Foreign Application Priority Data
Mar. 27, 2016 (JP) .................................. 2016-062919

(51) Int. Cl.
*H04N 5/225* (2006.01)
*B60R 11/04* (2006.01)
(Continued)

(52) U.S. Cl.
CPC .............. *B60R 11/04* (2013.01); *G03B 17/02* (2013.01); *G03B 17/561* (2013.01);
(Continued)

(58) Field of Classification Search
CPC .. H04N 5/2252; H04N 5/2253; H04N 5/2257; B60R 1/00; B60R 11/04; G03B 17/02; G03B 2217/002; H04M 1/0264
See application file for complete search history.

(56) References Cited

U.S. PATENT DOCUMENTS 7,965,336 B2 * 6/2011 Bingle .................... B60R 11/04
 348/374
10,440,242 B2 * 10/2019 Ahn ...................... H04N 5/2253
(Continued)

FOREIGN PATENT DOCUMENTS

| JP | 2008-118568 A | 5/2008 |
| JP | 2010-40720 A | 2/2010 |
| JP | 2013-123628 A | 6/2013 |

OTHER PUBLICATIONS

International Search Report dated May 30, 2017 during the prosecution of International Patent Application No. PCT/JP2017/012189.
(Continued)

Primary Examiner — Kelly L Jerakbek
(74) Attorney, Agent, or Firm — Troutman Pepper Hamilton Sanders LLP

(57) ABSTRACT

An electronic component mounting member, comprising: a flexible substrate, having flexibility, for connecting with another member, comprising: a main unit portion on which electronic components are mounted, and an extending portion, formed extending from the main unit portion, and having a terminal for connecting to another member; and a bending suppressing member disposed in the vicinity of a boundary line between the main unit portion and the extending portion, wherein: the flexible substrate has a cutout formed in the vicinity of the boundary line, and is connected to the other member in a state wherein the boundary line is bent. This enables provision of an electronic component (Continued)

mounting member for vehicle mounting, or the like, for preventing the occurrence of, for example, cracking of solder of electronic components that are mounted, even when using a flexible substrate.

4 Claims, 8 Drawing Sheets

(51) Int. Cl.
*G03B 17/02* (2006.01)
*G03B 17/56* (2006.01)

(52) U.S. Cl.
CPC ......... *H04N 5/2254* (2013.01); *H04N 5/2257* (2013.01); *G03B 2217/002* (2013.01); *G03B 2217/007* (2013.01)

(56) References Cited

U.S. PATENT DOCUMENTS

| | | | |
|---|---|---|---|
| 2011/0279675 A1* | 11/2011 | Mano | G02B 13/001 348/148 |
| 2014/0016028 A1 | 1/2014 | Sakurai | |
| 2017/0187931 A1* | 6/2017 | Onishi | B60R 1/00 |
| 2019/0058835 A1* | 2/2019 | Ichikawa | G03B 15/00 |

OTHER PUBLICATIONS

Notice of Reasons for Refusal issued in corresponding Japanese Patent Application No. 2016-062919 dated Oct. 8, 2019, with English translation.

\* cited by examiner

ELECTRONIC COMPONENT MOUNTED MEMBER, IMAGING DEVICE, AND IMAGING DEVICE FOR VEHICLE MOUNTING

CROSS-REFERENCE TO RELATED APPLICATIONS

This is a U.S. national phase application under 35 U.S.C. § 371 of International Patent Application No. PCT/JP2017/012189, filed Mar. 24, 2017, and claims benefit of priority to Japanese Patent Application No. 2016-062919, filed Mar. 27, 2016. The entire contents of these applications are hereby incorporated by reference.

FIELD OF TECHNOLOGY

One aspect of the present invention relates to a member for mounting an electronic component, for mounting in vehicles, used for mounting in a vehicle.

BACKGROUND

In recent years there has been a proliferation of cameras for mounting in vehicles, for the purpose of identifying the state at the time of an accident, avoiding collisions with obstacles and other vehicles, and the like. In members for installing electronic components for mounting in vehicles, including cameras for mounting in vehicles, the space for mounting is limited, and thus flexible substrates whereon electronic components, such as capacitors, are installed are often used in a state wherein they are folded. As prior art regarding such cameras for vehicle mounting, there are technologies such as described in, for example, US Patent Application Publication 2014/0160284, specification.

SUMMARY

However, when the conventional flexible substrate, set forth above, is used as-is, stresses are applied to the electronic components that are disposed in the vicinity of the part wherein the flexible substrate is folded, and, through this, problems have occurred wherein, for example, cracking occurs in the solder, and the like, used for mounting the electronic components. Moreover, there have also been problems that occur such as cracking and open circuits in the flexible substrates themselves.

The present invention adopts means such as the following in order to solve the problem described above. Note that while in the explanation below, reference symbols from the drawings are written parentheses for ease in understanding the present invention, the individual structural elements of the present invention are not limited to those that are written, but rather should be interpreted broadly, in a range that could be understood technically by a person skilled in the art.

One means according to the present invention is:

an electronic component mounting member, for vehicle mounting, or the like, comprising:

a flexible substrate (for example, and FPC 4), having flexibility, comprising: a main unit portion (4a) on which electronic components are mounted, and an extending portion (4b), formed extending from the main unit portion, and having a terminal for connecting to another member;

a bending suppressing member (5) disposed in the vicinity of a boundary line between the main unit portion and the extending portion, wherein:

the flexible substrate has a cutout formed in the vicinity of the boundary line, and is connected to the other member in a state wherein the boundary line is bent.

Given the electronic component mounting member set forth above, even when assembled for use in a state wherein the boundary line between the main unit portion and the extending portion of a flexible substrate is folded, no stress acts on the electronic components that are mounted on the member, thus enabling prevention of the occurrence of cracking of the solder, or the like, used in mounting the electronic component. Moreover this enables prevention of excessive stress acting on the boundary line between the main unit portion and the extending portion of the flexible substrate, thus enabling prevention of breakage and of the occurrence of open circuits at the boundary line.

Moreover, other means according the present invention are:

An imaging device for vehicle mounting, or the like, comprising:

the electronic component mounting member for vehicle mounting, or the like; and a lens barrel (1) that is transparent to light that is directed toward an imaging element, wherein the imaging element (41) is disposed on the flexible substrate.

The imaging device for a vehicle mounting, or the like, set forth above, enables prevention of cracking in the solder that is used to mount various types of electronic components onto the flexible substrate and prevention of breakage of the flexible substrate. This enables structuring of an imaging device, such as for mounting in a vehicle, with superior durability. Moreover, it is possible to structure an imaging device, such as for mounting in a vehicle, relatively inexpensively, due to the ability to use a flexible substrate that is relatively inexpensive when compared to a rigid substrate.

BRIEF DESCRIPTIONS OF THE DRAWINGS

FIG. 1 is a perspective diagram showing the front face side of a camera for vehicle mounting, or the like.

FIG. 2 is a perspective diagram showing the back face side of a camera for vehicle mounting, or the like.

FIG. 3 is perspective assembly diagram showing the front face side of a camera for vehicle mounting, or the like.

FIG. 4 is a perspective assembly diagram showing the back face side of a camera for vehicle mounting, or the like.

DETAILED DESCRIPTION

Embodiments according to the present invention will be explained in detail below, referencing the drawings, following the structures below. However, the embodiment explained below is no more than an example of the present invention, and must not be interpreted as limiting the technical scope of the present invention. Note that in the various drawings, identical reference symbols are assigned to identical structural elements, and explanations thereof may be omitted.

A distinctive feature of the camera for vehicle mounting, or the like, according to the present invention is that of including an FPC (a flexible printed circuit, a flexible substrate) structured for preventing cracking of the solder parts of electronic components that are mounted, and preventing breakage of the boundary line between the extending part and the main unit part. In the below, the structure of a camera for a vehicle mounting, or the like, according the present embodiment will be explained in specifics.

Figure 1:
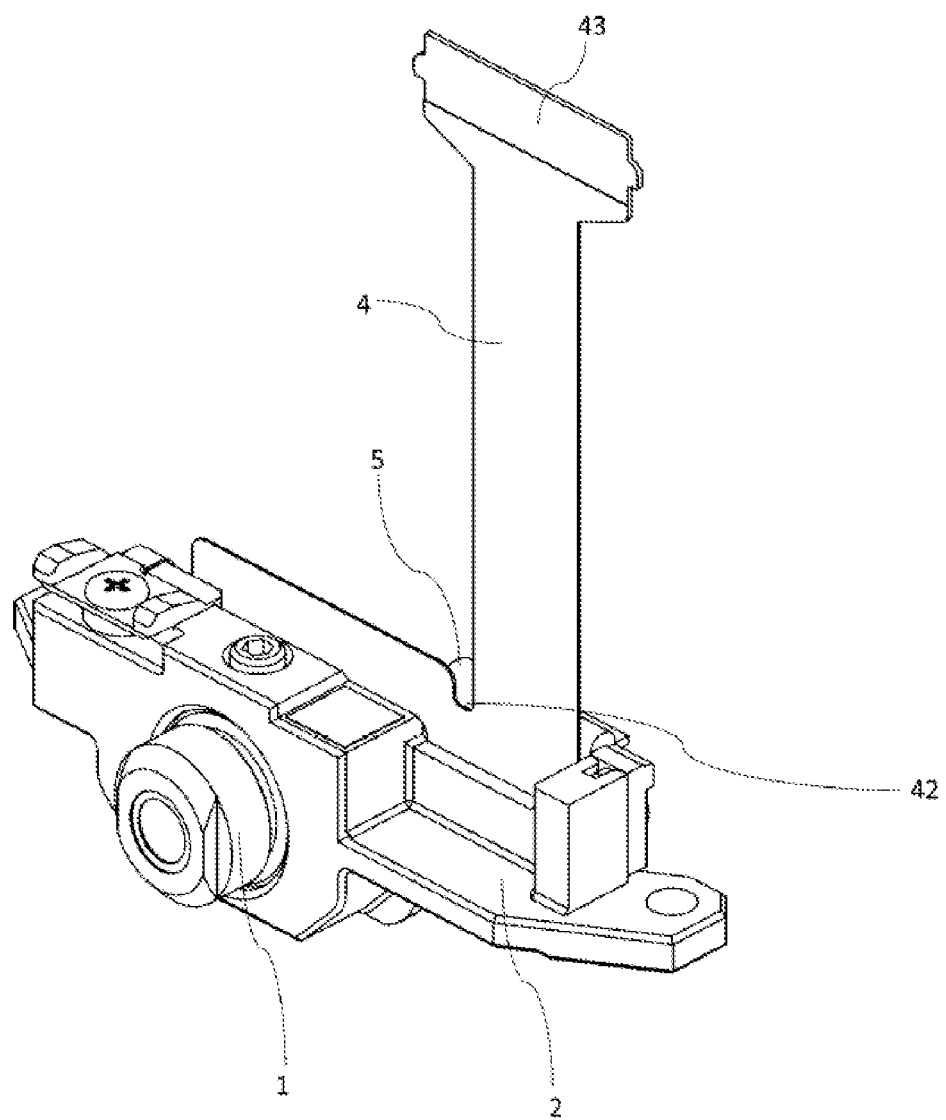
Figure 2:
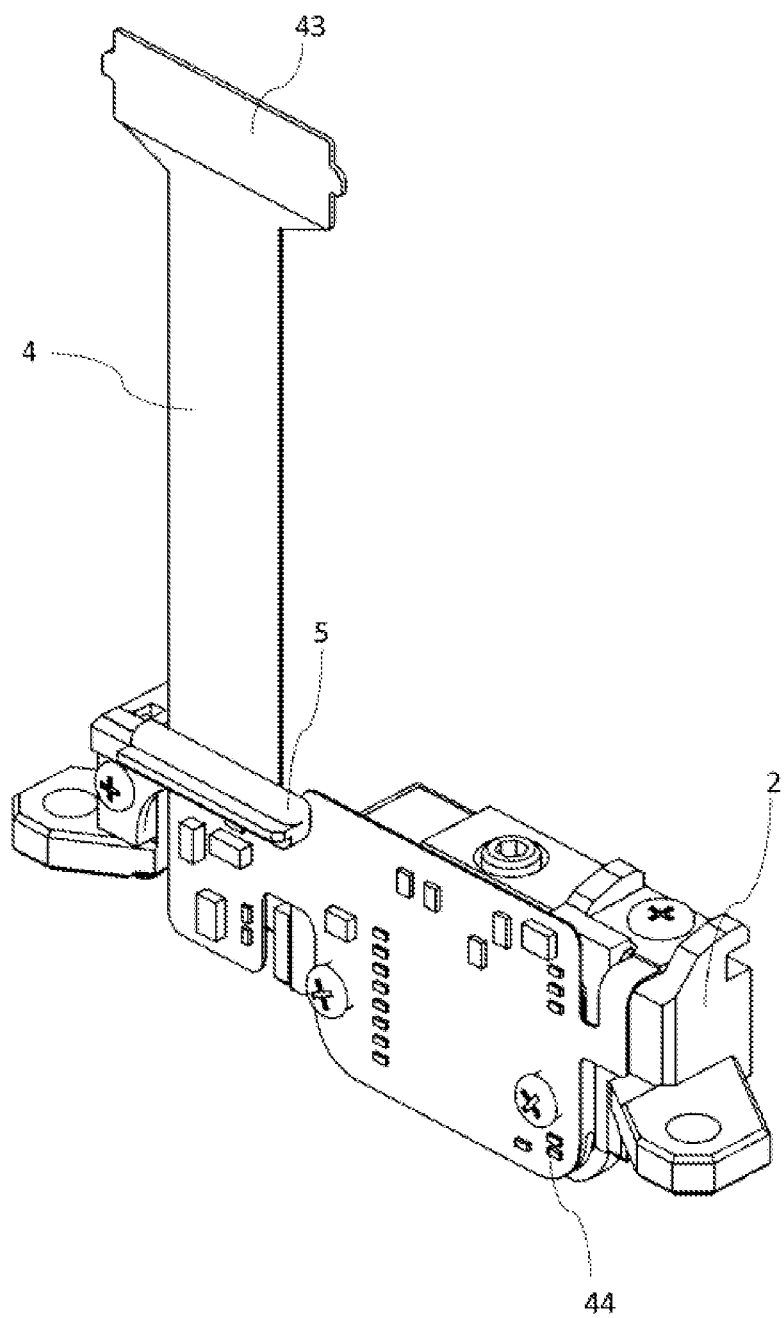
Figure 3:
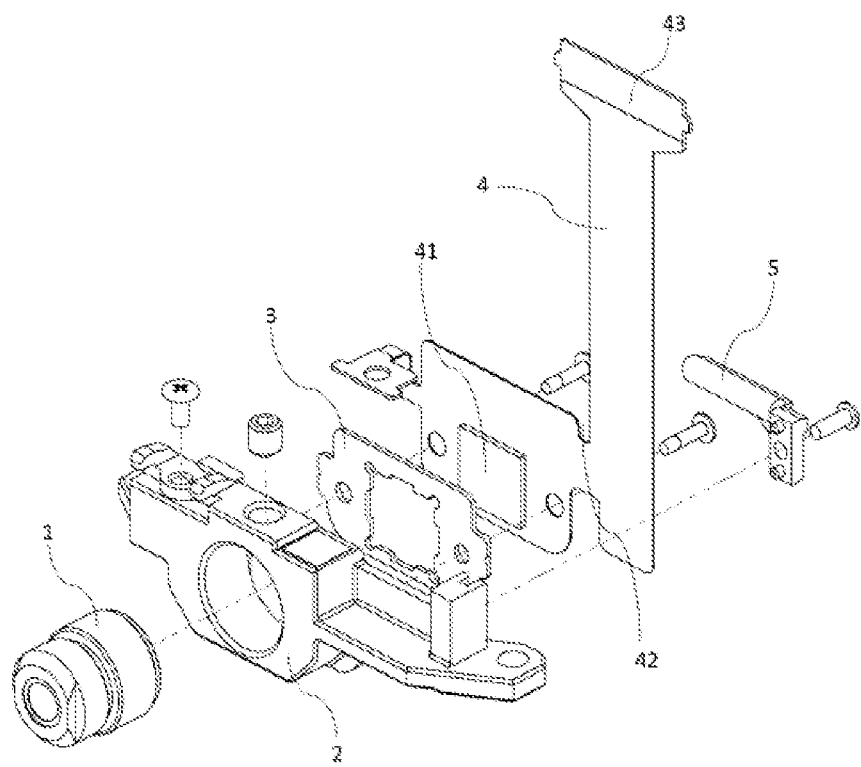
Figure 4:
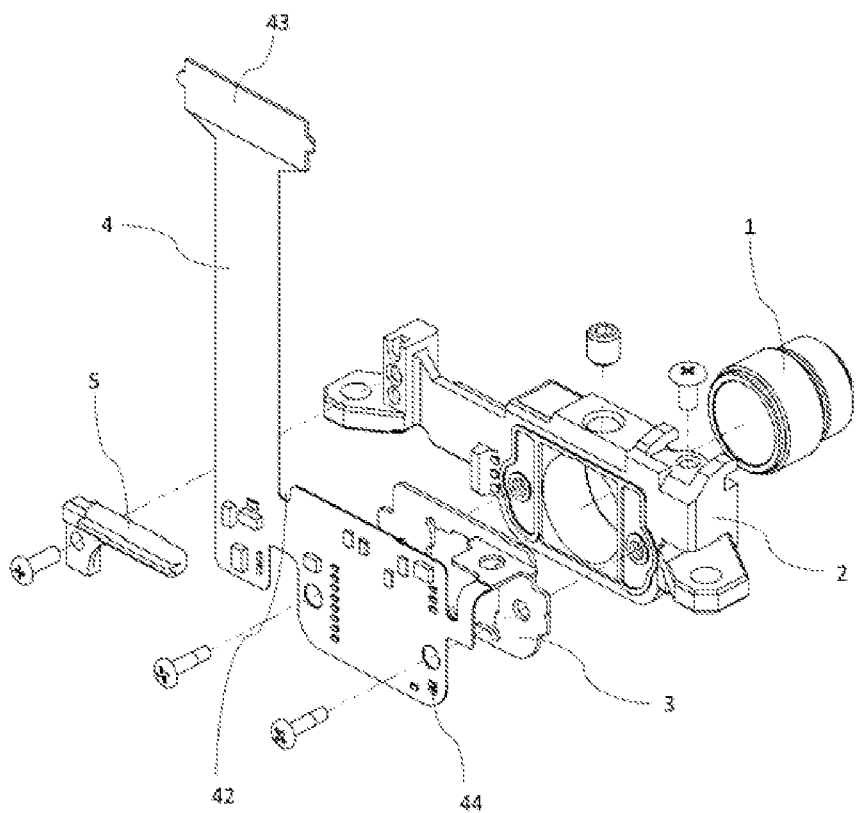

FIG. 1 in FIG. 2 are external perspective diagrams of a camera for a vehicle mounting, or the like, according to the present embodiment, where FIG. 1 is a perspective diagram viewed from the front face side (the imaging subject side), and FIG. 2 is a perspective diagram viewed from the back face side (the side opposite from the imaging subject side). FIG. 3 and FIG. 4 are exploded perspective diagrams of a camera for vehicle mounting, or the like, according to the present embodiment, where FIG. 3 is an exploded perspective diagram viewed from the front face side (the imaging subject side), and FIG. 4 is an exploded perspective diagram viewed from the back face side (the side opposite of the imaging subject side).

As illustrated in FIG. 1 through FIG. 4, the camera for vehicle mounting, or the like, according to the present embodiment is structured including a lens barrel 1, a lens holder 2, sheet metal 3, an FPC 4, and an FPC folding suppressing member 5. When the camera for vehicle mounting, or the like, is attached to a vehicle, it is attached in a state wherein the FPC 4 is curved. Note that the lens barrel 1, the lens holder 2, and the sheet metal 3 are structured in the same manner as the various structures in an imaging device, such as a conventional camera.

<The Lens Barrel 1>

The lens barrel 1 is structured in a circular column shape that includes one or a plurality of lenses, structured so that the incident light from the imaging subject is guided to the imaging element 41 while being refracted as appropriate.

<The Lens Holder 2>

The lens holder 2 is a main unit (body) part that is formed so as to support the lens barrel 1. The lens holder 2 is attached to the lens barrel 1, and the FPC whereon an imaging element 41 is mounted is disposed on the back face side (the side opposite from the imaging subject) thereof, with the sheet metal 3 interposed therebetween. The lens holder 2 is secured through connecting, through being connected to the sheet metal 3, the FPC 4, and the FPC folding suppressing member 5, through screws or the like.

<The Sheet Metal 3>

The sheet metal 3 is disposed between the lens holder 2 and the FPC 4, and is formed from metal. The sheet metal 3 may be formed from a material such as resin, or the like, instead.

<The FPC 4>

Figure 5:
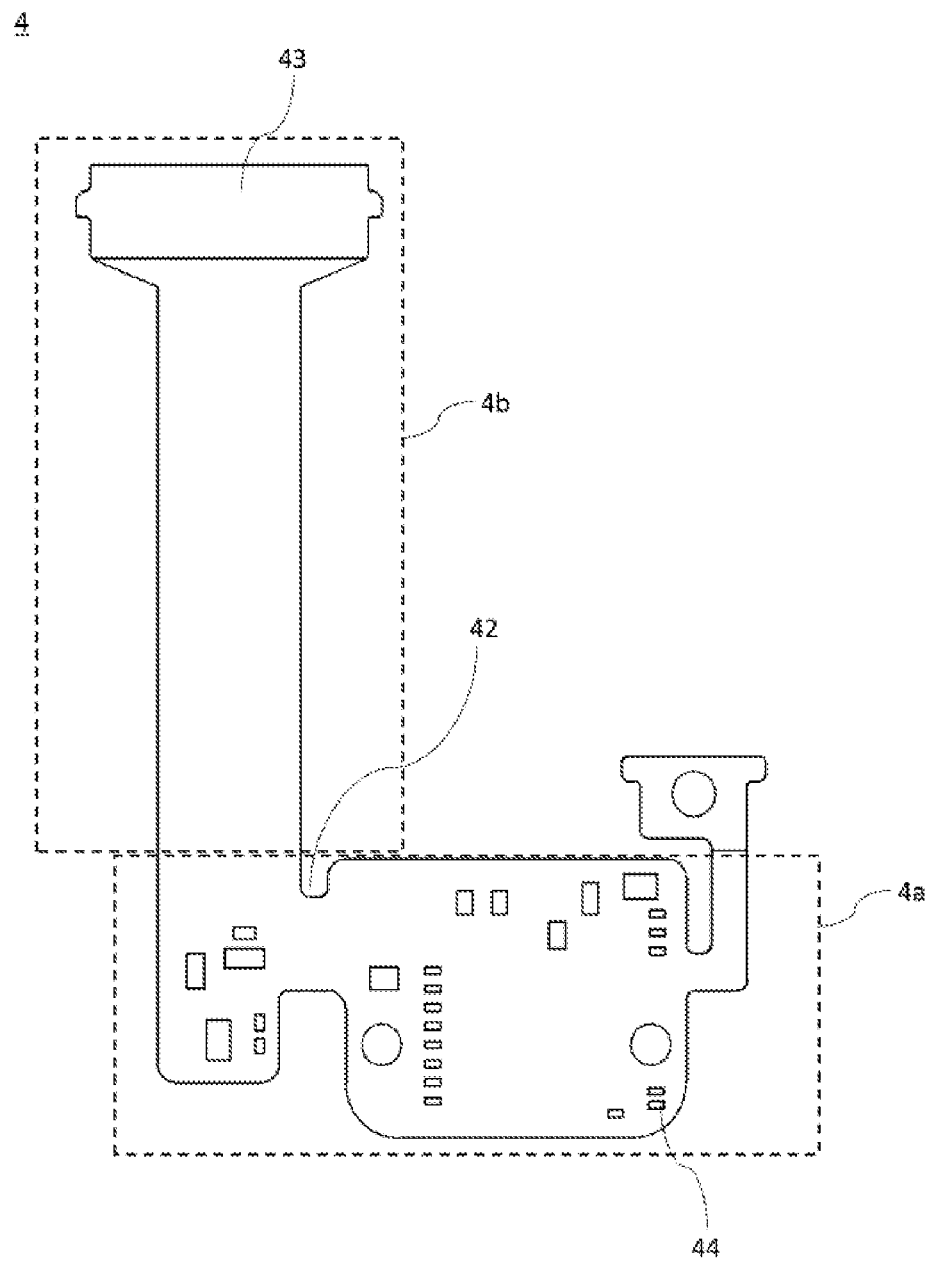
FIG. 5 is a diagram illustrating the structure of an FPC.
Figure 6:
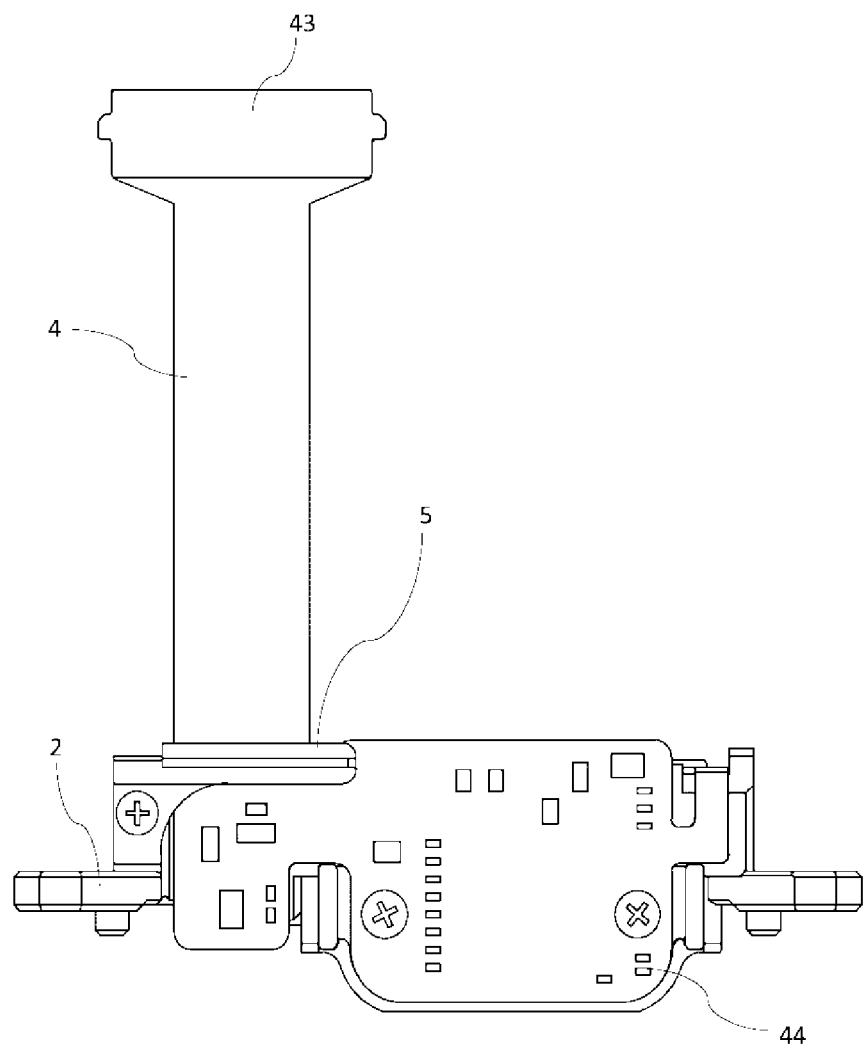
FIG. 6 is a diagram showing an electronic component mounting member (including an FPC and an FPC folding preventing member) in the assembled state (a diagram viewed from the back face side).

FPC 4 is a substrate that has flexibility, and is formed from a raw material that is foldable, such as resin. FIG. 5 is a diagram wherein the FPC 4 according the present embodiment is removed, a diagram wherein the FPC 4 is viewed from the back face side (the side opposite from the imaging subject side). FIG. 6 is a diagram wherein the camera for vehicle mounting, or the like, according to the present invention is viewed from the back face side of (the side opposite from the imaging subject side). As illustrated in FIG. 1 through FIG. 6, the imaging element 41 is mounted on the surface of the FPC 4 that faces the sheet metal 3. The imaging element 41 is a photoelectric converting element such as, for example, a CMOS or a CCD. Moreover, electronic components 44 are mounted on the surface of the FPC 4 that is opposite from the surface on which the imaging element 41 is disposed. The electronic components 44 are electronic components such as, for example, resistive elements, capacitors, switching elements, and the like. Interconnections for connecting the electronic components 44 and the imaging element 41 electrically are printed on the FPC 4. As illustrated in FIG. 5, the FPC 4 is divided into a main unit portion 4a and an extending portion 4b, and the imaging element 41 and the electronic components 44 are mounted on the main unit portion 4a. A connector inserting portion 43, for insertion of another member (for example, another circuit board) is formed on the end portion of the extending portion 4b of the FPC 4. Terminals for connecting to another member (for example, another circuit board) are formed on the connector inserting portion 43, and the terminals are connected electrically through the printed interconnection to the electronic components 44 and/or the imaging element 41. A cutout 42 is formed in the vicinity of the boundary line between the main unit portion 4a and the extending portion 4b.

Figure 7:
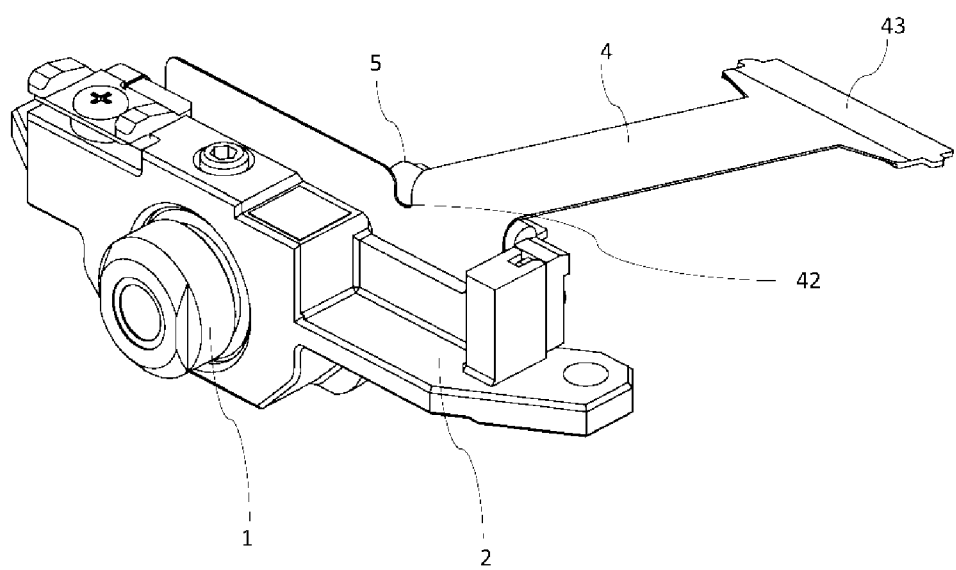
FIG. 7 is a perspective diagram, from the front face side, of a camera for vehicle mounting, or the like, in an assembled state with an electronic component mounting member (including an FPC and an FPC folding preventing member) folded.
Figure 8:
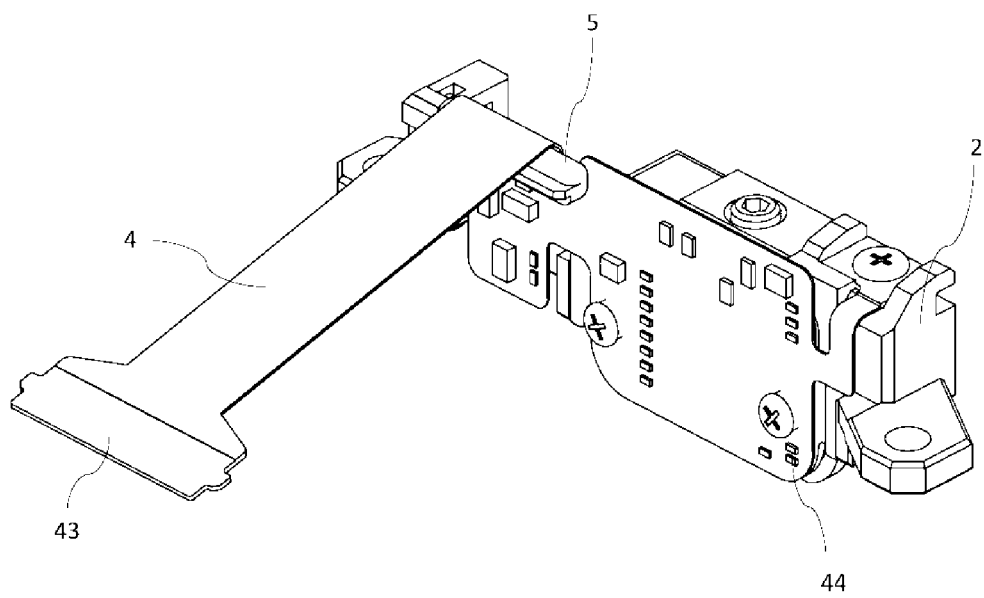
FIG. 8 is a perspective diagram, from the back face side, of a camera for vehicle mounting, or the like, in an assembled state with an electronic component mounting member (including an FPC and an FPC folding preventing member) folded. Note that the illustration omits the lens barrel.

FIG. 7 and FIG. 8 are external perspective diagrams of a state wherein the FPC 4 is folded for assembly into a camera for vehicle mounting, or the like, according to the present invention, where FIG. 7 is a perspective diagram when viewed from the front face side (the imaging subject side), and FIG. 8 is a perspective diagram when viewed from the back face side (the side opposite of the imaging subject side). As shown in FIG. 7 and FIG. 8, the FPC 4 is assembled in a state that is folded at the boundary line between the main unit portion 4a and the extending portion 4b. In this state, the connector inserting portion 43 of the FPC 4 is inserted into a connector of another member (for example, another substrate). Note that, as illustrated in FIG. 7 and FIG. 8, in the camera for vehicle mounting, or the like, according to the present embodiment, the FPC 4 (and specifically, the extending portion 4b of the FPC 4), is folded in the direction of the back face side of the camera for vehicle mounting, or the like.

<The FPC Folding Suppressing Member 5>

In the electronic component mounting member of the present embodiment, as illustrated in FIG. 7 and FIG. 8, the FPC folding suppressing member 5 is disposed, in the vicinity of the boundary line (joint) of the main unit portion 4a in the extending portion 4b, on the surface side of the FPC 4 that is opposite of the surface that faces the sheet metal 3. The FPC folding suppressing member 5 is formed from a raw material, such as resin, that has appropriate hardness, so as to not apply excessive stress to the FPC 4, nor to cause shorting over the printed interconnections of the FPC 4, when the FPC 4 and the FPC folding suppressing member 5 are in contact. The provision of the FPC folding suppressing member 5 prevents the occurrence of damage such as cracking, or the like, or the occurrence of open circuits in the printed interconnections that are formed on this part, through stress that is produced at the boundary line part between the main unit portion 4a and the extending portion 4b of the FPC 4 (and, specifically, stress that is produced when the FPC 4 is folded at the boundary line between the main unit portion 4a in the extending portion 4b.

The position wherein the FPC folding suppressing member 5, described above, should be a position so as to not produce damage, such as the cracks, or the like, described above. When an electronic component mounting member such as illustrated in FIG. 7 in FIG. 8 is used and the FPC 4 is folded in the direction toward the back side face of the camera for vehicle mounting, or the like, preferably the layout position of the FPC folding suppressing member 5 is at a position so as to cover some or all of the cutout 42, described above, when viewed from the back face side of the camera for vehicle mounting, or the like, according to the present embodiment.

As described above, in the camera for vehicle mounting, or the like, according to the present invention the FPC 4 can be folded and assembled so as to be disposed in a limited space. Moreover, in the camera for vehicle mounting, or the like, according the present embodiment, even when assembly and use is in a state wherein the boundary line of the main unit portion 4a in the extending portion 4b of the FPC 4 is folded, no stress is applied to the electronic components 44 that are mounted on the FPC 4, and thus this can prevent the occurrence of cracking of the solder that is used in mounting the electronic components 44. Moreover, the ability to prevent the application of excessive stress to the boundary line between the main unit portion 4a and the extending portion 4b of the FPC 4 enables the prevention of the occurrence of breaking at the boundary line, and the occurrence of open circuits. Moreover, in the camera for vehicle mounting, or the like, according to the present embodiment, the structure is one wherein no rigid substrate is used, but rather the various types of electronic components 44 are mounted on the FPC 4 alone, so that, when compared to a structure that uses a rigid substrate, the structure can be relatively less expensive and thinner.

Moreover, the camera for vehicle mounting, or the like, according to the present embodiment enables the prevention of cracking of solder that is used to mount various types of electronic components 44 to the FPC 4, and prevention of breakage in the FPC 4. This enables the structuring of a camera for vehicle mounting, or the like, with superior durability. Moreover, because this enables the use of an FPC 4, which is relatively less expensive when compared to a rigid substrate, this enables structuring a camera for vehicle mounting, or the like, that is relatively inexpensive.

An embodiment according to the present invention was explained in detail above. The explanation above is no more than an explanation of one form of embodiment, and the scope of the present invention is not limited to this form of embodiment, but rather is interpreted broadly, in a scope that can be understood by one skilled in the art.

While, in the embodiment described above, the explanation used a camera for vehicle mounting, or the like (and, more specifically, a vehicle-mounted camera) as a specific example, the present invention can be used broadly, for not only cameras for vehicle mounting, but for a mounting member for other electronic components used for vehicle mounting, or the like (and, more specifically, for vehicle-mounted cameras). Note that, in a camera for vehicle mounting, it is necessary to be placed in a limited space, so as to not interfere with the field of view of the driver, in the vicinity of the rearview mirror on the windshield of the vehicle, and thus there are benefits to employing, in particular, a structure that uses the FPC 4 according to the present embodiment.

Moreover, while the FPC 4 in the embodiment above is formed in a L shape, insofar as the structure is one that has a main unit portion 4a and an extending portion 4b, there is no limitation to being an L shape, but rather it may be formed into a T shape, a+shape, or the like.

The camera for vehicle mounting, or the like, according to the embodiment described above is an example of an imaging device for vehicle mounting, or the like, according to the present invention.

The present invention can be used effectively for imaging devices, or the like, for vehicle mounting.

The invention claimed is:

1. An electronic component mounting member, comprising:
    a flexible substrate, having flexibility, comprising:
        a main unit portion including:
            a first surface on which an imaging element is mounted,
            a second surface, opposite to the first surface, on which electronic components are mounted, and
            interconnections printed on the main unit portion for connecting the imaging element and the electronic components;
        an extending portion, formed extending from the main unit portion, and having a terminal for connecting to another member; and
    a bending suppressing member, formed from a resin material, disposed in the vicinity of a boundary line between the main unit portion and the extending portion, wherein:
    the flexible substrate is foldable about the bending suppressing member;
    the flexible substrate has a cutout formed in the vicinity of the boundary line, and the bending suppressing member at least partially overlays the cutout.

2. The electronic component mounting member of claim 1, wherein the electronic component mounting member is for vehicle mounting.

3. An imaging device for vehicle mounting, comprising:
    an electronic component mounting member as set forth in claim 2; and
    a lens that is transparent to light that is directed toward the imaging element.

4. An imaging device, comprising:
    an electronic component mounting member as set forth in claim 1; and
    a lens that is transparent to light that is directed toward the imaging element.

* * * * *